US011638970B2

(12) United States Patent
Matthews

(10) Patent No.: US 11,638,970 B2
(45) Date of Patent: May 2, 2023

(54) ENHANCED MATERIAL SHOCK USING SPATIOTEMPORAL LASER PULSE FORMATTING

(71) Applicant: Lawrence Livermore National Security, LLC, Livermore, CA (US)

(72) Inventor: Manyalibo Joseph Matthews, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 666 days.

(21) Appl. No.: 16/580,141

(22) Filed: Sep. 24, 2019

(65) Prior Publication Data

US 2021/0086302 A1 Mar. 25, 2021

(51) Int. Cl.
| | | |
|---|---|---|
| *B23K 26/356* | (2014.01) | |
| *B23K 26/073* | (2006.01) | |
| *B23K 26/0622* | (2014.01) | |
| *B23K 26/06* | (2014.01) | |

(52) U.S. Cl.
CPC ........ *B23K 26/356* (2015.10); *B23K 26/0608* (2013.01); *B23K 26/0622* (2015.10); *B23K 26/073* (2013.01)

(58) Field of Classification Search
CPC ....... B23K 26/352–356; B23K 26/0604–0619; B23K 26/067–0676; B23K 15/004; C21D 7/06
See application file for complete search history.

(56) References Cited

U.S. PATENT DOCUMENTS

| 6,198,069 B1 | 3/2001 | Hackel et al. |
| 6,752,593 B2 * | 6/2004 | Clauer ................ C21D 10/005 |
| 10,232,470 B2 * | 3/2019 | Sokol .................... B23K 26/356 |
| 2003/0062350 A1 | 4/2003 | Staver et al. |
| 2017/0291256 A1 | 10/2017 | Dulaney et al. |
| 2019/0255649 A1 | 8/2019 | Kurosaki et al. |

FOREIGN PATENT DOCUMENTS

| EP | 1812195 B1 | 5/2017 |
| KR | 10-2018-0079445 A | 7/2018 |

OTHER PUBLICATIONS

Duocastella Laser Photonics Rev. 6, No. 5, 607-621 (Year: 2014).*
Fabbro, J. of Laser Applications, published Nov. 3, 1998 (Year: 1998).*
Hackel, Lloyd et al. "Laser peening: A tool for additive manufacturing post-processing," Additive Manufacturing, vol. 24, 2018, pp. 67-75.
Anonymous, Boeing Awards MIC Laser Peening Contract to Form 747-8 Wing Sections, Curtiss-Wright, 2008.
(Continued)

*Primary Examiner* — Erin E McGrath
(74) *Attorney, Agent, or Firm* — Harness, Dickey & Pierce, P.L.C.

(57) ABSTRACT

The present disclosure relates to a laser based system for laser peening a workpiece. The system has a pulse laser configured to generate laser pulses and a controller for controlling operation of the pulse laser. The controller is further configured to control the pulse laser to cause the pulse laser to generate at least one of the laser pulses with a spatio-temporally varying laser fluence over a duration of the at least one of the laser pulses.

19 Claims, 3 Drawing Sheets

(56) References Cited

OTHER PUBLICATIONS

Manufacturing Group, Curtiss-Wright Awarded Rolls-Royce Contract, 2013. http://www.aerospacemanufacturinganddesign.com/article/uk-to-fund-development-of-jet-rocket-hybrid-engine-reaction-sabre- 071713/. (Accessed Sep. 26, 2017 2017).

Anonymous, Laser Peening by CWST Contributes to Successful Nuclear Canister Storage Program, The Shot Peener magazine 32(2) (2018).

K. Raja, M. Nathan M, T. Patil Balram, C.D. Naiju, Study of Surface Integrity and Effect of Laser Peening on Maraging Steel Produced by Lasercusing Technique, SAE International, 2018.

N.C. Anderholm, Lasergenerated Stress Waves, Applied Physics Letters 16(3) (1970) 113-115.

P.S. Prevey, D.J. Hornbach, P.W. Mason, Thermal Residual Stress Relaxation and Distortion in Surface enhanced Gas Turbine Engine Components, in: D. Milam, J. Dale A. Poteet, G.D. Pfaffman, V. Rudnev, A. Muehlbauer, W.B. Albert (Eds.) Heat Treating 1997: Proceedings of the 17th Conference, Indianapolis, IN, 1997.

* cited by examiner

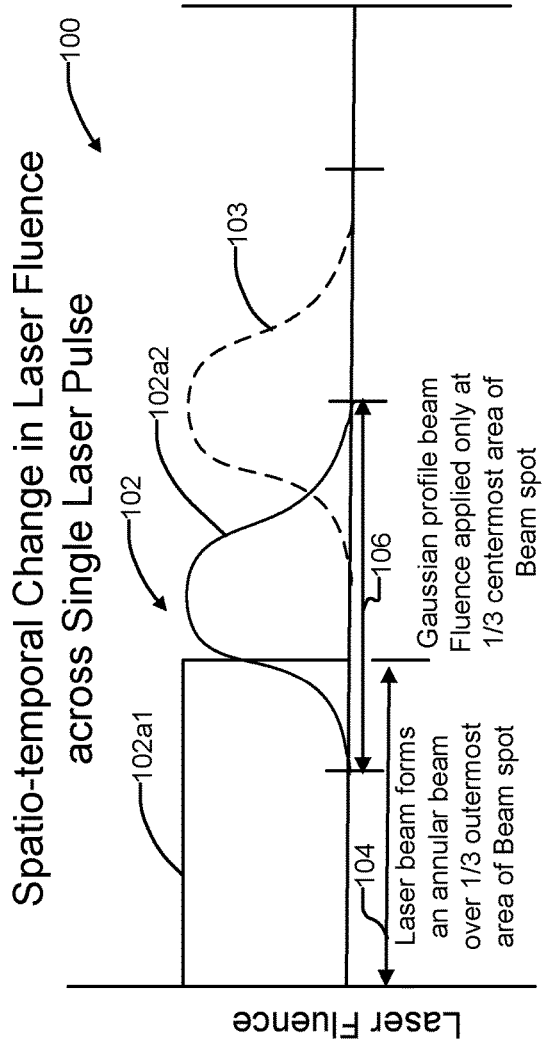
FIGURE 3
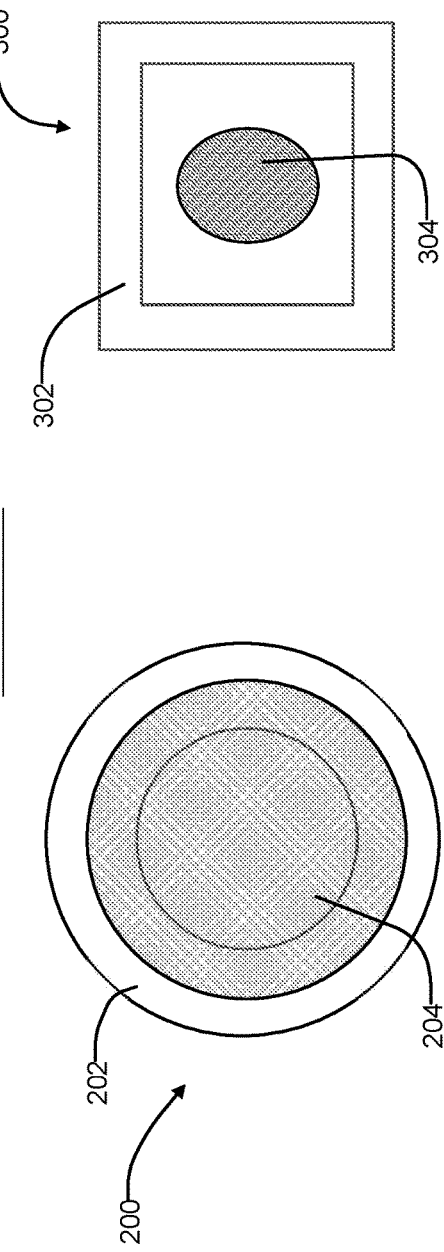
FIGURE 5
FIGURE 4

ENHANCED MATERIAL SHOCK USING SPATIOTEMPORAL LASER PULSE FORMATTING

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to pulsed laser material processing systems and methods, and in one example particularly to a system and method which generates spatiotemporal varying pulses during a laser shock peening operation, to even more effectively create compressive stresses deep below a surface of a workpiece.

BACKGROUND

The statements in this section merely provide background information related to the present disclosure and may not constitute prior art.

Pulsed laser processing of materials has been used in a variety of applications from micro-machining, engraving, 3D printing and laser shock peening. In all applications, the generation of extreme temperatures and pressures at a specific location allows materials to be processed in ways that are generally not available to continuous wave (CW) lasers. For example, laser shock peening is a process that plastically compresses material normal to a surface, resulting in transverse (Poisson) expansion. A thicker or otherwise constrained component's ability to resist the transverse straining results in a local buildup of compressive stress. For thinner components, the peening results in strain and shape change. Such is the case for all types of compressive surface treatments including shot, laser, and ultrasonic peening and processes such as deep cold rolling. FIG. 1 illustrates how the introduction of compressive stress into a material works when using laser peening, keeping in mind that the concept of plastic compression and transverse expansion is common to all treatments.

Laser peening (LP) is a particularly important post processing method for metal parts. Laser peening is now extensively used to enhance the fatigue lifetime of jet engine fan and compressor blades, and more recently in aircraft structures, and even in spent nuclear fuel storage canisters. It has also been applied to improve surface properties in additively manufactured Maraging steel. Laser peening technology is also used to apply curvature and stretch to thick sections of aircraft wing panels, thus providing precise aerodynamic shaping. In the LP process, short intensive laser pulses create a plasma in a confined geometry, which is shown as area "A" in FIG. 1. This results in pressure pulses that create local plastic deformation. An ablative layer can be used in the process or, as in this work, such a layer may be omitted, resulting in only a very shallow (10 to 20 µm thick) layer of recast material that can be left on the surface or easily polished off. Use of a water tamper "B" increases the generating pressure by an order of magnitude thus making the process more efficient. Depending on variables such as material and geometry, existing residual compressive stresses, desired strains or desired microstructure, modifications to stress state and/or shape can be precisely generated in parts in a spot-by-spot manner using the LP method. Laser peened materials typically demonstrate higher cracking and corrosion resistance and are becoming widely used in manufacturing.

Laser peening is also known for creating very small amounts of cold work, typically 3% to 5%, typically leaving the phase, hardness, and yield strength of the treated material unchanged. Shot peening typically requires multiple impacts estimated, for example, at 13 impacts for 100% coverage. Due to the spherical nature of the impacts, the shot generates transverse as well as normal forces and plastic deformation. This working of the surface increases hardness and generates cold work. While cold work isn't necessarily bad, physical ball peening has limited penetration depth and therefore efficiency compared to laser shock peening.

SUMMARY

This section provides a general summary of the disclosure, and is not a comprehensive disclosure of its full scope or all of its features.

In one aspect the present disclosure relates to a laser based system for laser peening a workpiece. The system may comprise a pulse laser configured to generate laser pulses, and a controller for controlling operation of the pulse laser. The controller may be configured to control the pulse laser to cause the pulse laser to generate at least one of the laser pulses with a spatio-temporally varying laser fluence over its duration.

In another aspect the present disclosure relates to a laser based system for laser peening a workpiece. The system may comprise a pulse laser configured to generate laser pulses, and a controller for controlling operation of the pulse laser. The controller may be configured to control the pulse laser to cause the pulse laser to generate the laser pulses with a spatio-temporally varying laser fluence over a duration of the at least one of the laser pulses. The spatio-varying fluence forms a first beam component and a second beam component, the first and second beam components further being generated to overlap in time and to create an overlapping shock at a desired location below a surface of the workpiece.

In still another aspect the present disclosure relates to a method for laser shock peening a workpiece. The method may comprise generating a plurality of laser pulses directed at a surface of the workpiece. The method may further include, for each laser pulse, further controlling the generation of the pulse to have a spatio-temporally varying laser fluence over a duration of the laser pulse that creates first and second beam components for the laser pulse. The first and second beam components propagate into the workpiece to a location below a surface of the workpiece and create shocks in the workpiece at a controlled depth below the surface. The beam components are further created such that the shocks overlap one another at a desired location within the workpiece.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 3 is a graph further illustrating how the two pulse components described in connection with the system shown in FIG. 2 are created to overlap in time, or alternatively to not overlap in time, to create two distinct shock waves that propagate to and overlap at a predetermined location and depth within the workpiece;

FIG. 4 is a plan view of another beam construction of the present disclosure which uses an annular outer beam component with a partially overlapping Gaussian profile beam spot, which is arranged concentrically with the outer annular beam component; and FIG. 5 is still another example of a beam construction of the present disclosure in which a square shaped, annular, outer beam component is used with an elliptically shaped, Gaussian profile beam component, which is also arrange concentrically within the square shaped, annular outer beam component.

DETAILED DESCRIPTION

Example embodiments will now be described more fully with reference to the accompanying drawings.

Figure 1:
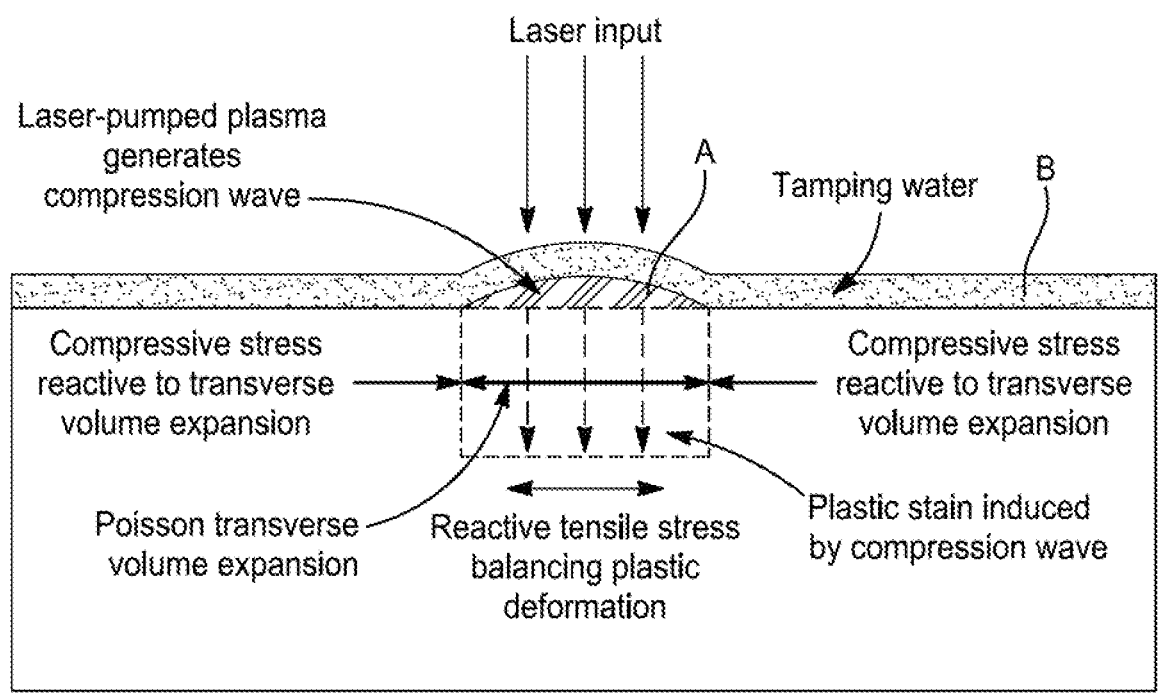
FIG. 1 is a prior art illustration showing how laser shock peening plastically deforms material generating an internal compressive stress field.

A principal feature of the present disclosure is shaping of a laser-induced shock being applied to a material surface, through simultaneous spatio-temporal pulse shaping. In contrast to the conditions shown in FIG. 1, a non-uniform input may be used that varies in time to allow a build-up or constructive accumulation of shock at a selected, specific point in the material. Similar to a lens, the phase of the pulse preferably scales across the laser beam such that different components of the laser pulse arrive at the surface at different times.

Figure 2:
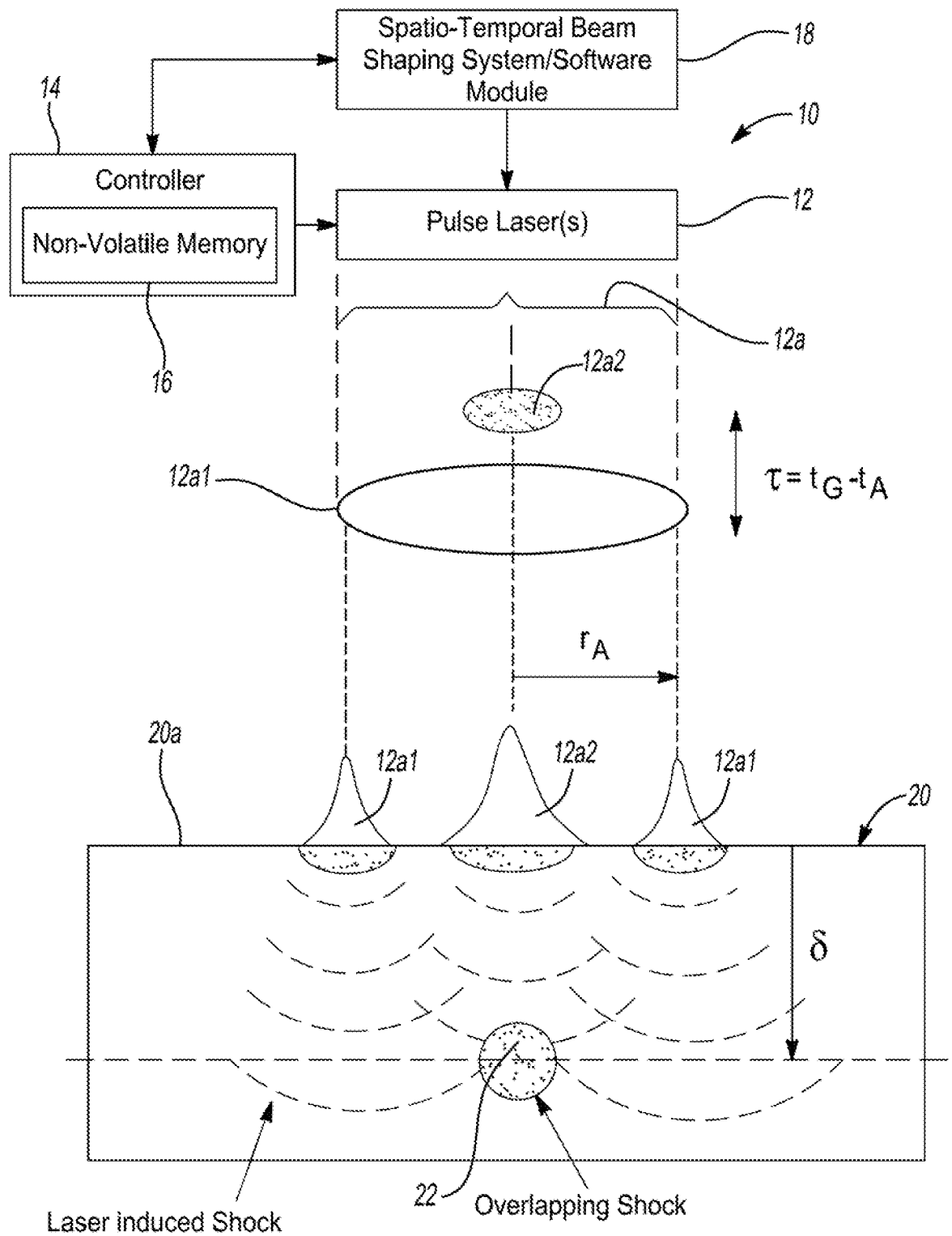
FIG. 2 is a high level diagrammatic illustration showing how a spatio-temporal laser pulse is used to create a controlled, overlapping shock region, for enhanced laser shock peening.

Referring to FIG. 2, a system 10 in accordance with one embodiment of the present disclosure is shown. The system 10 may include one or more lasers 12 (e.g., pulse laser) and a controller 14 for controlling On/Off operation of the laser(s) 12. While the use of two or more lasers is contemplated, for convenience, the following discussion will focus on the system using a single pulse laser 12. The controller 14 may be formed by a computer or any other suitable type of processing component which is able to control On/Off operation of the laser 12 with the necessary degree of control to create a series of carefully timed pulses. The controller 14 may include a non-volatile memory 16 (e.g., RAM, ROM, etc.) for storing any data/parameters needed for operation of the system 10. The controller 14 may also communicate with a spatio-temporal beam shaping system/software module 18 (hereinafter simply "beam shaping module" 18) for controlling the shape (i.e., fluence) of laser energy applied by each pulse of the laser 12 to a workpiece 20 by a beam 12a of the laser 12.

While it is anticipated that the use of a single, spatio-temporally generated pulse, applied repeatedly, will likely be a preferable implementation of the system 10, FIG. 2 shows the use of two distinct beam components 12a1 and 12a2 to more easily help the reader visualize how the spatio-temporal beam shaping applied by the system 10 operates. In this example one beam component 12a1 of the beam 12 consists of an annular or 'donut' shaped beam that arrives at time $t_A$. The other beam component 12a2 is a standard Gaussian profile beam that arrives at a later time $t_G$, but still while the beam 12a1 is being applied to the workpiece 20. If the relative delay between the start of the two beam components 12a1 and 12a2 is $\tau = t_G - t_A$, the radial position of the annular beam component 12a1 may be given by $r_A$ and the laser-induced shock velocity caused by beam component 12a1 can be given by $v_S$. The shock from the two pulses 12a1 and 12a2 will coincide at depth $\delta$ (denoted by reference number 22) below an upper surface 20a of the workpiece. This produces an enhancement of shock in the material of the workpiece 20 for $\tau = (\delta/v_s)(\sqrt{1 + r^2_A/\delta^2} - 1)$.

One skilled in the art will recognize multiple optical configurations that will lead to such an enhancement, so long as individual components of the pulse 12a arrive at the same desired location at the same time, given the above equation. This is also illustrated in graph 100 of FIG. 3. The graph 100 illustrates a single laser pulse 102 in which the laser fluence is modified throughout the pulse length, and simultaneously spatially over the cross-sectional area of the beam, to achieve the same (or closely similar) result as that described above in connection with the distinct first and second beam pulse components 102a1 and 102a2. The overall length of the pulse 102 (comprising both beam pulse components 102a1 and 102a2) may be in the millisecond range, the microsecond range or the nanosecond range, or possibly even shorter. In this example the single pulse 102 is initially created to apply a laser fluence, indicated by first beam pulse component 102a1, to generate a first shock wave in the workpiece 20. This laser fluence creating the first beam pulse component 102a1 is applied for a first time duration 104, which in this example represents only a fractional portion of the overall duration of the single pulse 102. It will be understood, however, that the first beam pulse component 102a1 may be applied during the full time of the pulse 102 or any other fractional portion thereof, depending the needs of a particular application. Then in this example, while the laser fluence creating the first beam pulse component 102a1 is still being applied to the workpiece 20, the pulse 102 begins to apply the second beam pulse component 102a2, which in this example has a Gaussian profile beam fluence. As such, in this example the first beam pulse component 102a1 and the second beam pulse component 102a2 are being applied simultaneously. Alternatively, the first beam pulse component 102a1 and the second beam pulse component 102a2 may be applied such that they are separated in time, such as indicated by dashed Gaussian beam spot 103. Still further, more than two distinct beam pulse components may be applied, where all overlap one another, or only certain portions of the beam portions overlap one another, or none of the beam portions overlap one another, and all of these variations are contemplated by the present disclosure. And while the beam pulse components 102a1 and 102a2 may be annular and Gaussian profile beams, respectively, virtually any other beam pattern shapes (e.g., square, elliptical, etc.) are readily implementable using the system 10, with suitable modifications to the beam shaping module 18 and/or its software. In either instance, the shocks created by the beam pulse components 102a1 and 102a2 created in the workpiece 20 propagate toward one another and overlap at a precise X-Y location within the workpiece, and at a precisely controlled depth below the upper surface 20a of the workpiece 20. Furthermore, any number of pulses can be imposed with similar synchronization to achieve optimized processing conditions. Indeed, a continuously varying 'composite' pulse can be contemplated in which the spatiotemporal shaping of a single pulse allows for portions of it to arrive at different locations within the workpiece 20 at different times. One possible method to achieve this would be to spatially 'chirp' the laser pulse and send it through dispersive elements that delay different spatial components.

FIG. 4 shows a laser beam 200 in accordance with another construction in which an outer annular beam component 202 is created, which is partially overlapped by an inner Gaussian profile beam spot 204 (shown in shading) centered within the outer annular beam component. FIG. 5 shows still another example of a beam construction 300 which may be implemented using the system 10. In this example an outer, square, annular beam component 302 is created, and a separate Gaussian profile beam spot component 304 is centered within the outer, annular beam component 302. In the beams 200 and 300, the beam components may be generated to overlap in time or such that they do not overlap in time. These are but a few variations of the shapes that the beam components may take. Those skilled in the art will appreciate that the precise cross-sectional shape of the beam components, and the precise degree of time overlap (or no time overlap), will be dictated in part by the specific material being used, the laser fluence being applied with each beam component, and the depth of penetration (or overall effect) that one wishes to achieve with the introduction of compressive stress into the material workpiece 20.

A particular advantage of the system 10 and method of the present disclosure is that laser peening with, for example, a square or rectangular beam, as used here in one embodiment of the system, in contrast generates 100% coverage in only one impact per beam spot (i.e., one impact of the beam 12a). The impact angle, which is determined by the plasma pressure on the surface 20a of the workpiece 20 material being acted on and not the laser light incident angle, is totally normal to the surface 20a, thus generating little hardening or cold work. Additionally, the large footprint of the laser beam 12a, typically 3 mm to 10 mm on a side, and the steady nature of the shock, result in a very deep (multiple mm) plastic deformation of the material of the workpiece 20 before the shock drops below the yielding limit. Previously published work in this area has compared cold work generated by shot, gravity and laser peening as inferred from the measured angular dispersion in x-ray diffraction. The deep, strong shock produced by the system 10 inserts dislocations equally deep into materials which helps resist crack initiation and growth, thereby supporting enhancement in fatigue strength and increasing the lifetime of treated components. The system 10 creates especially deep compressive stresses which resist the advance of cracks, as well as providing superior resistance to stress corrosion cracking in susceptible materials. By selectively and compressively pre-stressing high tensile stress areas of components, the laser peening performed using the system 10 also enables even higher levels of tensile fatigue loading before the fatigue limit of a material is reached.

It should also be noted that different embodiments of the system 10 may include multiple, synchronized pulses from a single laser or from multiple lasers. Furthermore, because processing may take place at some distance and through dispersive media (e.g., water in laser shock peening or air for long stand-off material processing), the laser system may include additional dispersion compensating elements to account for this.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A laser based system for laser peening a workpiece, the system comprising:
   a pulse laser configured to generate laser pulses;
   a controller for controlling operation of the pulse laser; and
   the controller further configured to control the pulse laser to cause the pulse laser to generate at least one of the laser pulses with a spatio-temporally varying laser fluence over a duration of the at least one of the laser pulses; and
   the spatio-temporally varying laser fluence is configured to create first and second beam components of the at least one of the laser pulses which impinge a common surface of the workpiece at different times; and
   wherein the first and second beam components are configured to be timed in their arrival at the common surface to create an overlapping shock at a desired location below the common surface of the workpiece.

2. The system of claim 1, wherein the first and second beam components are generated to overlap one another in time.

3. The system of claim 1, wherein one of the first and second beam components comprises an annular shaped beam component.

4. The system of claim 1, wherein one of the first and second beam components comprises a Gaussian profile shaped beam component.

5. The system of claim 1, wherein one of the first and second beam components comprises at least one of a circular spot, an elliptical spot or an annular square shape.

6. The system of claim 5, wherein the at least one of the circular spot or the elliptical spot further comprises a laser fluence having a Gaussian profile.

7. The system of claim 1, wherein the first and second beam components are formed such that they do not overlap spatially when impinging the common surface of the workpiece.

8. The system of claim 1, wherein the first and second beam components are formed such that they overlap spatially when impinging the common surface of the workpiece.

9. The system of claim 1, wherein the first and second beam components of the at least one laser pulse are timed to propagate towards, and to arrive at, the same location within an interior area of the workpiece at the same time.

10. The system of claim 1, wherein the first one of the first and second beam components comprises an annular or shaped beam that arrives at time $t_A$, and the second one of the first and second beam components comprises a standard Gaussian profile beam that arrives at a later time $t_G$, but while the first beam component is still being applied to the workpiece, and wherein a relative delay between a start of the first and second beam components is defined as:

$$\tau = t_G - t_A$$

11. A laser based system for laser peening a workpiece, the system comprising:
    a pulse laser configured to generate laser pulses;
    a controller for controlling operation of the pulse laser; and
    the controller further configured to control the pulse laser to cause the pulse laser to generate each of the laser pulses with a spatio-temporally varying laser fluence over a duration of each said laser pulse; and
    wherein the spatio-temporally varying laser fluence is configured to form a first beam component and a second beam component applied along parallel paths to impinge a common surface of the workpiece, the first and second beam components further being generated to overlap in time, and to create an overlapping shock at a desired location below the common surface of the workpiece; and
    wherein the first and second beam components have different beam profiles and are configured to arrive at the common surface at different times to create the overlapping shock at the desired location below the common surface.

12. The system of claim 11, wherein one of the first and second beam components comprises an annular shaped beam component.

13. The system of claim 11, wherein one of the first and second beam components comprises a Gaussian profile shaped beam component.

14. The system of claim 11, wherein one of the first and second beam components comprises at least one of a circular spot, an elliptical spot, or an annular square shape.

15. The system of claim 11, wherein the first one of the first and second beam components comprises an annular or shaped beam that arrives at time tA, and the second one of the first and second beam components comprises a standard Gaussian profile beam that arrives at a later time tG, but while the first beam component is still being applied to the common surface of the workpiece, and wherein a relative delay between a start of the first and second beam components is defined as:

$$\tau = t_G - t_A$$

16. A method for laser peening a workpiece, the method comprising:
    generating a plurality of laser pulses directed at a surface of the workpiece;
    for each said laser pulse, further controlling the generation of the pulse to have a spatio-temporally varying laser fluence over a duration of the laser pulse that creates first and second beam components for the laser pulse; and
    the first and second beam components being timed in their arrival at a common surface to impinge the common surface of the workpiece and propagate propagating through the common surface into the workpiece to a location below the common surface of the workpiece, and creating shocks in the workpiece at a controlled depth below the common surface, the beam components further being controlled such that the beam components create an overlapping shock at a desired depth within the workpiece.

17. The method of claim 16, wherein the first beam component is applied before the second beam component.

18. The method of claim 16, wherein the second beam component is applied while the first beam component is still being generated, such that the first and second beam components overlap one another in time.

19. The method of claim 16, wherein creation of the first and second beam components comprises:
- creating one of the first and second beam components with an annular beam shape; and
- creating the other one of the first and second beam components as a spot having a Gaussian profile beam fluence.

* * * * *